United States Patent
Prokschi et al.

(10) Patent No.: US 9,290,600 B2
(45) Date of Patent: Mar. 22, 2016

(54) FOAM PRODUCED FROM POLYPROPYLENE WITH LOW GEL CONTENT

(71) Applicant: Borealis AG, Vienna (AT)

(72) Inventors: Hermann Prokschi, Wartberg ob der Aist (AT); Hermann Braun, Linz (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/414,796

(22) PCT Filed: Jul. 19, 2013

(86) PCT No.: PCT/EP2013/065262
§ 371 (c)(1),
(2) Date: Jan. 14, 2015

(87) PCT Pub. No.: WO2014/016205
PCT Pub. Date: Jan. 30, 2014

(65) Prior Publication Data
US 2015/0203621 A1    Jul. 23, 2015

(30) Foreign Application Priority Data
Jul. 25, 2012  (EP) .................................. 12177879

(51) Int. Cl.
| | |
|---|---|
| *C08F 255/02* | (2006.01) |
| *C08J 9/00* | (2006.01) |
| *C08L 23/14* | (2006.01) |
| *C08L 23/26* | (2006.01) |
| *C08L 23/12* | (2006.01) |

(52) U.S. Cl.
CPC ................. *C08F 255/02* (2013.01); *C08J 9/00* (2013.01); *C08L 23/142* (2013.01); *C08L 23/26* (2013.01); *C08L 23/12* (2013.01); *C08L 2205/02* (2013.01); *C08L 2205/025* (2013.01)

(58) Field of Classification Search
CPC ........ C08F 255/02; C08J 9/00; C08L 23/142; C08L 23/26; C08L 2205/02; C08L 2205/025; C08L 23/12
See application file for complete search history.

(56) References Cited

U.S. PATENT DOCUMENTS

| | | | | |
|---|---|---|---|---|
| 4,552,930 A | * | 11/1985 | Hirota | C08F 210/06 525/333.8 |
| 4,693,990 A | * | 9/1987 | Hiroyuki | C08F 10/00 502/115 |
| 5,143,880 A | * | 9/1992 | Sasaki | C08F 10/00 502/108 |
| 6,077,907 A | | 6/2000 | Raetzsch et al. | |
| 6,767,857 B1 | * | 7/2004 | Thorman | C08F 10/00 502/103 |
| 2007/0004861 A1 | | 1/2007 | Cai et al. | |
| 2010/0047544 A1 | | 2/2010 | Busch et al. | |
| 2010/0063212 A1 | | 3/2010 | Oysaed et al. | |

FOREIGN PATENT DOCUMENTS

| | | |
|---|---|---|
| EP | 0879830 B1 | 11/2002 |
| EP | 0787750 B1 | 5/2003 |
| EP | 1892264 A1 | 2/2008 |
| EP | 2000504 A1 | 12/2008 |
| EP | 2492293 A1 | 8/2012 |
| JP | 2015522701 A | 8/2015 |
| WO | 2011141070 A1 | 11/2011 |
| WO | 2014/016205 A1 | 1/2014 |
| WO | 2014016206 A1 | 1/2014 |

OTHER PUBLICATIONS

First Japanese Office Action dated Jun. 23, 2015.
Hani E Naguib et al. "Fundamental Foaming Mechanisms Governing the Volume Expnasion of Extruded Polypropylene Foams", Journal of Applied Polymer Science, vol. 91, 2661-2668 (2004).
M. H. Wagner et al. "Rheotens-Mastercurves and Drawability of Polymer Melts", Polymer Engineering and Science, Mid-Apr. 1996, vol. 36, No. 7.
Foam Extrusion Principles and Practice, Edited by S.-T. Lee, Ph.D. Sealed Air Corporation.
Japanese Decision of Refusal dated Oct. 15, 2015.

* cited by examiner

*Primary Examiner* — Irina S Zemel
(74) *Attorney, Agent, or Firm* — Tarolli, Sundheim, Covell & Tummino LLP

(57) ABSTRACT

Process for providing a polypropylene composition comprising a branched polypropylene in which a polypropylene with a melt flow rate $MFR_2$ (230° C.) of more than 0.5 g/10 min is reacted with a thermally decomposing free radical-forming agent and optionally with a bifunctionally unsaturated monomer obtaining thereby the branched polypropylene, wherein the polypropylene composition has a $F_{30}$ melt strength of more than 20.0 cN and a $V_{30}$ melt extensibility of more than 200 mm/s.

14 Claims, No Drawings

FOAM PRODUCED FROM POLYPROPYLENE WITH LOW GEL CONTENT

The present invention relates to a method of providing a polypropylene composition having high melt strength and a low gel content. Furthermore, the present invention also relates to a corresponding high melt strength (HMS) polypropylene composition with low gel content as well as to the manufacture of a foam based on the polypropylene composition with high melt strength and low gel content.

High melt strength polypropylene (HMS-PP) compositions are generally known in the art. However, one challenge within existing HMS-PP is their varying foam quality. The foam quality is increased in case the gel content of the used high melt strength polypropylene is low.

Further, as known in the art, additives are normally added to plastic materials in order to improve the performance thereof. Examples of typical additives are e.g. antioxidants or pigments etc. These additives are often added to the plastic base material in the form of an additive mixture having incorporated the additives into a small amount of polymer powder. The additive mixture is sometimes also referred to as masterbatch. The small quantity of polymer powder used for the additive mixture is normally dosed at the end of the HMS process. However, the contribution to the final gel content of this additive mixture is often overlooked. Further up to now it has been not recognized that also the molecular weight of the base polymer powder in the manufacture of the high melt strength polypropylene (HMS-PP) has significant impact on the final foam properties.

EP 0 879 830, filed by Borealis in 1997, describes the basics of the Borealis high melt strength (HMS) post-reactor process where peroxide and butadiene are used to make long chain branched polypropylene (LCB-PP) materials. This patent covers a wide range of powder melt flow rates (MFRS) and particle sizes. However, it does not specify the impact of the type of base polymer as well as the polypropylene powder used for the preparation of the additive mixture on the HMS quality in particular on the foam quality based on the gel content in the high melt strength polypropylene.

There remains a need in the art for a method to produce high melt strength polypropylene (HMS-PP) of reliable and/or improved quality.

Accordingly the object of the present invention is to provide a process which enables a skilled person to produce a polypropylene composition and a foam made of said polypropylene composition with low gel content.

The present inventors now surprisingly found that the final gel content can be significantly reduced by increasing the MFR of the base polymer.

Thus, the present invention relates to a process for providing a polypropylene composition comprising a branched polypropylene (b-PP), the process comprises at least a step (a) in which a polypropylene (PP) is reacted with a thermally decomposing free radical-forming agent and optionally with bifunctionally unsaturated monomer(s) and/or with multifunctionally unsaturated low molecular weight polymer(s) obtaining thereby the branched polypropylene (b-PP),
wherein
(a) the polypropylene (PP) has a melt flow rate $MFR_2$ (230° C.) of more than 0.5 g/10 min;
(b) the polypropylene composition and/or the branched polypropylene (b-PP) has/have a $F_{30}$ melt strength of more than 20.0 cN and a $v_{30}$ melt extensibility of more than 200 mm/s, wherein the $F_{30}$ melt strength and the $v_{30}$ melt extensibility are measured according to ISO 16790:2005.

The present invention further provides a polypropylene composition comprising
(a) 95 to 99 parts by weight of a branched polypropylene (b-PP); and
(b) optionally 1 to 5 parts by weight of a polypropylene (PP') having a melt flow rate $MFR_2$ (230° C.) measured according to ISO 1133 of more than 0.5 to 18.0 g/10 min,
wherein the polypropylene composition has
a melt flow rate $MFR_2$ (230° C.) measured according to ISO 1133 of 1.0 to below 7.0 g/10 min, and
a gel content of less than 1.00 wt.-%, preferably below 0.80 wt.-%;
and wherein the polypropylene composition and/or the branched polypropylene (b-PP) has/have a $F_{30}$ melt strength of 25.0 cN to 50.0 cN and a $v_{30}$ melt extensibility of 210 to 300 mm/s, wherein the $F_{30}$ melt strength and the $v_{30}$ melt extensibility are measured according to ISO 16790:2005.

The present invention further relates to a process for the manufacture of a foam comprising
(A) the process for providing of a polypropylene composition comprising a branched polypropylene (b-PP), the process comprises at least a step (a) in which a polypropylene (PP) is reacted with a thermally decomposing free radical-forming agent and optionally with bifunctionally unsaturated monomer(s) and/or with multifunctionally unsaturated low molecular weight polymer(s) obtaining thereby the branched polypropylene (b-PP),
wherein
(i) the polypropylene (PP) has a melt flow rate $MFR_2$ (230° C.) of more than 0.5 g/10 min;
(ii) the polypropylene composition and/or the branched polypropylene (b-PP) has/have a $F_{30}$ melt strength of more than 20.0 cN and a $v_{30}$ melt extensibility of more than 200 mm/s, wherein the $F_{30}$ melt strength and the $v_{30}$ melt extensibility are measured according to ISO 16790: 2005,
(B) subjecting the polypropylene composition of step (A) to a foaming process obtaining thereby a foam.

Additionally the present invention is directed to a process for the manufacture of a foam comprising the step of subjecting a polypropylene composition to a foaming process obtaining thereby a foam, wherein the polypropylene composition comprises
(a) 95 to 99 parts by weight of a branched polypropylene (b-PP); and
(b) optionally 1 to 5 parts by weight of a polypropylene (PP') having a melt flow rate $MFR_2$ (230° C.) measured according to ISO 1133 of more than 0.5 to 18.0 g/10 min,
wherein the polypropylene composition has
a melt flow rate $MFR_2$ (230° C.) measured according to ISO 1133 of 1.0 to below 7.0 g/10 min, and
a gel content of less than 1.00 wt.-%, preferably below 0.80 wt.-%;
and wherein the polypropylene composition and/or the branched polypropylene (b-PP) has/have a $F_{30}$ melt strength of 25.0 cN to 50.0 cN and a $v_{30}$ melt extensibility of 210 to 300 mm/s, wherein the $F_{30}$ melt strength and the $v_{30}$ melt extensibility are measured according to ISO 16790:2005.

Additionally the invention is directed to the use of a polypropylene (PP) having a melt flow rate $MFR_2$ (230° C.) of more than 0.5 g/10 min in the manufacture of a branched polypropylene (b-PP) and thus in the manufacture of a polypropylene composition comprising the branched polypropylene (b-PP) to reduce the gel content of the branched polypropylene (b-PP) and/or of the polypropylene composition comprising the branched polypropylene (b-PP). Preferably the gel content is reduced in case the branched polypropylene (b-PP) and/or the polypropylene composition comprising the branched polypropylene (b-PP) has/have a gel content of less than 1.00 wt.-%, preferably of less than 0.80 wt.-%.

In the following the invention is described in more detail.

First the individual components, i.e. the polypropylene (PP), like the linear polypropylene (1-PP'), the polypropylene (PP'), like the linear polypropylene (1-PP'), the branched polypropylene (b-PP), and the additives (A), used in the instant invention as well as the polypropylene composition are described. Subsequently the claimed processes are described in more detail as well as the foam and the use of the polypropylene (PP). However any information or any preferred embodiment provided for the individual components or the polypropylene composition is also applicable for the inventive processes and for the inventive use, if reference is made to the individual components and the polypropylene composition, respectively.

The Branched Polypropylene (b-PP)

The major component for the polypropylene composition to be provided according to the invention is a branched polypropylene (b-PP). A branched polypropylene differs from a linear polypropylene that the polypropylene backbone covers side chains whereas a non-branched polypropylene, i.e. a linear polypropylene, does not cover side chains. The side chains have significant impact on the rheology of the polypropylene. Accordingly linear polypropylenes and branched polypropylenes can be clearly distinguished by its flow behavior under stress.

Branching can be achieved by using specific catalysts, i.e. specific single-site catalysts, or by chemical modification. Concerning the preparation of a branched polypropylene obtained by the use of a specific catalyst reference is made to EP 1 892 264. With regard to a branched polypropylene obtained by chemical modification it is referred to EP 0 879 830 A1. In such a case the branched polypropylene is also called high melt strength polypropylene. The branched polypropylene (b-PP) according to the instant invention is obtained by chemical modification as described in more detail below and thus is a high melt strength polypropylene (HMS-PP). Therefore the terms "branched polypropylene (b-PP)" and "high melt strength polypropylene (HMS-PP)" can be regarded in the instant invention as synonyms.

Therefore the branched polypropylene (b-PP), i.e. the high melt strength polypropylene (HMS-PP), as the major component of the polypropylene composition has a $F_{30}$ melt strength of more than 20.0 cN and a $v_{30}$ melt extensibility of more than 200 mm/s, preferably has a $F_{30}$ melt strength of more than 20.0 to 50.0 cN and a $v_{30}$ melt extensibility of more than 200 to 300 mm/s, in order to provide a resulting polypropylene composition with good shear thinning properties. The $F_{30}$ melt strength and the $v_{30}$ melt extensibility are measured according to ISO 16790:2005.

Typically the instant polypropylene composition also has a $F_{30}$ melt strength of more than 20.0 cN and a $v_{30}$ melt extensibility of more than 200 mm/s, preferably has a $F_{30}$ melt strength of more than 20.0 to 50.0 cN and a $v_{30}$ melt extensibility of more than 200 to 300 mm/s.

In a preferred embodiment, the branched polypropylene (b-PP), i.e. the high melt strength polypropylene (HMS-PP), has (a) a $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN; and (b) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

In especially preferred embodiment the branched polypropylene (b-PP), i.e. the high melt strength polypropylene (HMS-PP), has a $F_{30}$ melt strength of more than 20.0 cN and a $v_{30}$ melt extensibility of more than 210 to 300 mm/s, like a $F_{30}$ melt strength of more than 20.0 to 50.0 cN and $v_{30}$ melt extensibility of more than 220 to 300 mm/s, more preferably a $F_{30}$ melt strength of more than 21.0 cN and $v_{30}$ melt extensibility of more than 225 mm/s, still more preferably a $F_{30}$ melt strength of 21.0 to 50.0 cN and $v_{30}$ melt extensibility of 225 to 300 mm/s, yet more preferably a $F_{30}$ melt strength of 25.0 to 50.0 cN and $v_{30}$ melt extensibility of 230 to 290 mm/s, still yet more preferably a $F_{30}$ melt strength of 25.0 to 45.0 cN and $v_{30}$ melt extensibility of 230 to 290 mm/s, most preferably a $F_{30}$ melt strength of 30.0 to 45.0 cN and $v_{30}$ melt extensibility of 230 to 290 mm/s, like a $F_{30}$ melt strength of 32.0 to 42.0 cN and $v_{30}$ melt extensibility of 230 to 290 mm/s.

Further it is preferred that said branched polypropylene (b-PP), preferably the high melt strength polypropylene (HMS-PP), has a melt flow rate $MFR_2$ (230° C.) measured according to ISO 1133 of not more than 7.0 g/10 min, more preferably in a range of 0.5 to 7.0 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

Hence in one specific embodiment, the branched polypropylene (b-PP), i.e. the high melt strength polypropylene (HMS-PP), has (a) a melt flow rate $MFR_2$ (230° C.) not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min;

(b) a $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN; and (c) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

Accordingly in specific embodiment the branched polypropylene (b-PP), i.e. the high melt strength polypropylene (HMS-PP), has a melt flow rate $MFR_2$ (230° C.) of not more than 7.0 g/10 min, a $F_{30}$ melt strength of more than 20.0 cN and a $v_{30}$ melt extensibility of more than 210 to 300 mm/s, like a melt flow rate $MFR_2$ (230° C.) in a range of 0.5 to 7.0 g/10 min, a $F_{30}$ melt strength of more than 20.0 to 50.0 cN and $v_{30}$ melt extensibility of more than 220 to 300 mm/s, more preferably a melt flow rate $MFR_2$ (230° C.) in a range of 0.5 to 6.0 g/10 min, a $F_{30}$ melt strength of more than 21.0 cN and $v_{30}$ melt extensibility of more than 225 mm/s, still more preferably a melt flow rate $MFR_2$ (230° C.) in a range of 1.0 to 6.0 g/10 min, a $F_{30}$ melt strength of 21.0 to 50.0 cN and $v_{30}$ melt extensibility of 225 to 300 mm/s, yet more preferably a melt flow rate $MFR_2$ (230° C.) in a range of 1.0 to 6.0 g/10 min, a $F_{30}$ melt strength of 25.0 to 50.0 cN and $v_{30}$ melt extensibility of 230 to 290 mm/s, still yet more preferably a melt flow rate $MFR_2$ (230° C.) in a range of 1.0 to 5.0 g/10 min, a $F_{30}$ melt strength of 25.0 to 45.0 cN and $v_{30}$ melt extensibility of 230 to 290 mm/s, most preferably a melt flow rate $MFR_2$ (230° C.) in a range of 1.0 to 5.0 g/10 min, a $F_{30}$ melt strength of 30.0 to 45.0 cN and $v_{30}$ melt extensibility of 230 to 290 mm/s, like a melt flow rate $MFR_2$ (230° C.) in a range of 1.0 to 5.0 g/10 min, a $F_{30}$ melt strength of 32.0 to 42.0 cN and $v_{30}$ melt extensibility of 230 to 290 mm/s.

Preferably, the branched polypropylene (b-PP), i.e. the high melt strength polypropylene (HMS-PP), has a melting point of at least 130° C., more preferably of at least 135° C. and most preferably of at least 140° C. The crystallization temperature is preferably at least 110° C., more preferably at least 120° C.

Further, the branched polypropylene (b-PP), i.e. the high melt strength polypropylene (HMS-PP), can be a branched random propylene copolymer (b-R-PP), i.e. a high melt strength random propylene copolymer (R-HMS-PP), or a branched propylene homopolymer (b-H-PP), i.e. a high melt strength propylene homopolymer (H-HMS-PP), the latter being preferred.

For the purpose of the present invention, the expression "propylene homopolymer" refers to a polypropylene that consists substantially, i.e. of at least 97 mol.-%, preferably of at least 98 mol.-%, more preferably of at least 99 mol.-%, most preferably of at least 99.8 mol.-% of propylene units. In a preferred embodiment only propylene units in the propylene homopolymer are detectable.

In case the branched polypropylene (b-PP), i.e. the high melt strength polypropylene (HMS-PP), is a branched random propylene copolymer (b-R-PP), i.e. a high melt strength random propylene copolymer (R-HMS-PP), it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the branched random propylene copolymer (b-R-PP), i.e. the high melt strength random propylene copolymer (R-HMS-PP), comprises, especially consists of, monomers copolymerizable with propylene from the group consisting of ethylene, 1-butene and 1-hexene. More specifically the branched random propylene copolymer (b-R-PP), i.e. the high melt strength random propylene copolymer (R-HMS-PP), comprises—apart from propylene—units derivable from ethylene and/or 1-butene. In a preferred embodiment the branched random propylene copolymer (b-R-PP), i.e. the high melt strength random propylene copolymer (R-HMS-PP), comprises units derivable from ethylene and propylene only. The comonomer content in the branched random propylene copolymer (b-R-PP), i.e. in the high melt strength random propylene copolymer (R-HMS-PP), is preferably in the range of more than 0.2 to 10.0 mol.-%, still more preferably in the range of more than 0.5 to 7.0 mol.-%.

In this regard it is to mention that the high melt strength polypropylene (HMS-PP) being either a high melt strength propylene homopolymer (H-HMS-PP) or a high melt strength random propylene copolymer (R-HMS-PP) may comprise additionally unsaturated monomers different to the comonomers defined for the high melt strength random propylene copolymer (R-HMS-PP). In other words the high melt strength propylene homopolymer (H-HMS-PP) or the high melt strength random propylene copolymer (R-HMS-PP) may comprise unsaturated units, like bifunctionally unsaturated monomer(s) and/or multifunctionally unsaturated low molecular weight polymer(s) as defined in detail below, being different to propylene, ethylene and other $C_4$ to $C_{12}$ α-olefins. Accordingly the definition of homopolymer and copolymer in view of the high melt strength polypropylene (HMS-PP) refers actually to the unmodified polypropylene, i.e. to the polypropylene (PP), preferably to the linear polypropylene (1-PP), used to obtain the melt strength polypropylene (HMS-PP) by chemical modification as defined in detail below.

Accordingly in one preferred embodiment the branched polypropylene (b-PP), i.e. the high melt strength polypropylene (HMS-PP), comprises
(a) if it is a high melt strength propylene homopolymer (H-HMS-PP) units derived from
  (i) propylene and
  (ii) bifunctionally unsaturated monomer(s) and/or multifunctionally unsaturated low molecular weight polymer(s),
or
(b) if it is a high melt strength random propylene copolymer (R-HMS-PP) units derived from
  (i) propylene
  (ii) ethylene and/or $C_4$ to $C_{10}$ α-olefins, e.g. 1-butene and/or 1-hexene, preferably erthylene, and
  (iii) bifunctionally unsaturated monomer(s) and/or multifunctionally unsaturated low molecular weight polymer(s), "Bifunctionally unsaturated" or "multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals (see below). The unsaturated sites in the bi- or multifunctionally unsaturated compounds are in their chemically bound state not actually "unsaturated", because the double bonds are each used for a covalent bond to the polymer chains of the unmodified polypropylene, i.e. of the polypropylene (PP), preferably of the linear polypropylene (1-PP).

Reaction of the bifunctionally unsaturated monomer(s) and/or multifunctionally unsaturated low molecular weight polymer(s), preferably having a number average molecular weight ($M_n$) ≤10000 g/mol, synthesized from one and/or more unsaturated monomers with the unmodified polypropylene, i.e. with the polypropylene (PP), preferably with the linear polypropylene (1-PP), are performed in the presence of a thermally free radical forming agent, e. g. decomposing free radical-forming agent, like a thermally decomposable peroxide.

The bifunctionally unsaturated monomers may be
  divinyl compounds, such as divinylaniline, m-divinylbenzene, p-divinylbenzene, divinylpentane and divinylpropane;
  allyl compounds, such as allyl acrylate, allyl methacrylate, allyl methyl maleate and allyl vinyl ether;
  dienes, such as 1,3-butadiene, chloroprene, cyclohexadiene, cyclopentadiene, 2,3-dimethylbutadiene, heptadiene, hexadiene, isoprene and 1,4-pentadiene;
  aromatic and/or aliphatic bis (maleimide) bis (citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight ($M_n$) ≤10000 g/mol may be synthesized from one or more unsaturated monomers.

Examples of such low molecular weight polymers are
  polybutadienes, especially where the different microstructures in the polymer chain, i.e. 1,4-cis, 1,4-trans and 1,2-(vinyl) are predominantly in the 1,2-(vinyl) configuration copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The branched polypropylene, i.e. the high melt strength polypropylene (HMS-PP), may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the branched polypropylene, i.e. in the high melt strength polypropylene (HMS-PP), is 0.01 to 10.0 wt.-% based on said branched polypropylene, i.e. based on said high melt strength polypropylene (HMS-PP).

In a preferred embodiment the branched polypropylene (b-PP), i.e. the high melt strength polypropylene (HMS-PP), is free of additives (A). Accordingly in case the instant polypropylene composition comprises additives (A), these additives (A) are not brought in the polypropylene composition during the manufacture of the branched polypropylene (b-PP), i.e. of the high melt strength polypropylene (HMS-PP).

The Polypropylene (PP)

As mentioned above, the branched polypropylene (b-PP), i.e. the high melt strength polypropylene (HMS-PP), is a modified polypropylene, which is obtained by reacting the polypropylene (PP) with a thermally decomposing free radical-forming agent and optionally with bifunctionally unsaturated monomer(s) and/or with multifunctionally unsaturated low molecular weight polymer(s).

Essential aspect of the invention is that a specific unmodified polypropylene must be used in the present invention for the manufacture of the branched polypropylene (b-PP), i.e. of the high melt strength polypropylene (HMS-PP), and thus for the manufacture of the polypropylene composition comprising the branched polypropylene (b-PP), i.e. comprising the high melt strength polypropylene (HMS-PP). A particular finding is that the polypropylene (PP), preferably the linear polypropylene (1-PP), must have a rather low molecular weight and thus a rather high melt flow rate. Accordingly it is preferred that the polypropylene (PP), preferably the linear polypropylene (1-PP), has a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min In one specific example the polypropylene (PP), preferably the linear polypropylene (1-PP), has a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min, with the proviso that the values of 1.0 g/10 min, 10.0 g/10 min and 45.0 g/10 min are excluded.

The branched polypropylene (b-PP), i.e. the high melt strength polypropylene (HMS-PP), differs from the polypropylene (PP) which is used for its manufacture that the backbone of the branched polypropylene (b-PP), i.e. of the high melt strength polypropylene (HMS-PP), covers side chains whereas the staring product, i.e. the polypropylene (PP), does not cover or nearby does not cover side chains. The side chains have significant impact on the rheology of the polypropylene. Accordingly staring product, i.e. the polypropylene (PP), and the obtained branched polypropylene (b-PP), i.e. the high melt strength polypropylene (HMS-PP), can be clearly distinguished by its flow behavior under stress.

Further, as mentioned above the polypropylene (PP) is preferably a linear polypropylene (1-PP). The same considerations apply to the polypropylene (PP') as discussed in detail below which is also in a preferred embodiment a linear polypropylene (1-PP'). Accordingly, throughout the instant invention, the term "linear polypropylene" indicates that the linear polypropylene, shows no or nearby no-branching structure. Due to the absence of branches, the linear polypropylenes, i.e. the linear polypropylene (1-PP) and the linear polypropylene (1-PP'), are preferably featured by a low $v_{30}$ melt extensibility and/or a low $F_{30}$ melt strength.

Thus it is preferred that the linear polypropylene (1-PP) has
(a) a $F_{30}$ melt strength of more than 1.0 cN, preferably of more than 2.0 cN, more preferably in the range of 1.0 to below 68.0 cN, still more preferably in the range of 1.5 to 65.0 cN, yet more preferably in the range of 2.0 to 60.0 cN, still yet more preferably in the range of 2.5 to 50.0 cN like in the range of 2.5 to 45.0 cN;
and
(b) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

In other words it is preferred that the linear polypropylene (1-PP) has a $F_{30}$ melt strength of more than 1.0 cN and a $v_{30}$ melt extensibility of below 200 mm/s, preferably a $F_{30}$ melt strength of more than 2.0 cN and a $v_{30}$ melt extensibility of below 190 mm/s, more preferably a $F_{30}$ melt strength in the range of 1.0 to below 68.0 cN and a $v_{30}$ melt extensibility in the range of 100 to below 200 mm/s, yet more preferably a $F_{30}$ melt strength in the range of 1.5 to 65.0 cN and in the range of 120 to 190 mm/s, still yet more preferably a $F_{30}$ melt strength in the range of 2.0 to 60.0 cN and in the range of 120 to 190 mm/s, like a $F_{30}$ melt strength in the range of 2.5 to 50.0 cN and a $v_{30}$ melt extensibility in the range of 120 to 175 mm/s.

Accordingly in one specific embodiment the linear polypropylene (1-PP) has
(a) a melt flow rate $MFR_2$ (230° C.) measured according to ISO of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min;
(b) a $F_{30}$ melt strength of more than 1.0 cN, preferably of more than 2.0 cN, more preferably in the range of 1.0 to below 68.0 cN, still more preferably in the range of 1.5 to 65.0 cN, yet more preferably in the range of 2.0 to 60.0 cN, still yet more preferably in the range of 2.5 to 50.0 cN like in the range of 2.5 to 45.0 cN; and
(c) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

Therefore, in one specific embodiment the polypropylene (PP) is a linear polypropylene (1-PP) having a melt flow rate $MFR_2$ (230° C.) of more than 0.5 g/10 min, a $F_{30}$ melt strength of more than 1.0 cN and a $v_{30}$ melt extensibility of below 200 mm/s, preferably a melt flow rate $MFR_2$ (230° C.) in the range of more than 0.5 to 18.0 g/10 min, a $F_{30}$ melt strength of more than 2.0 cN and a $v_{30}$ melt extensibility of below 190 mm/s, more preferably a melt flow rate $MFR_2$ (230° C.) in the range of more 0.6 to 15.0 g/10 min, a $F_{30}$ melt strength in the range of 1.0 to 68.0 cN and a $v_{30}$ melt extensibility in the range of 100 to below 200 mm/s, yet more preferably a melt flow rate $MFR_2$ (230° C.) in the range of more 0.5 to 10.0 g/10 min a $F_{30}$ melt strength in the range of 2.0 to 60.0 cN and in the range of 120 to 190 mm/s, still yet more preferably a melt flow rate $MFR_2$ (230° C.) in the range of more 0.6 to 9.0 g/10 min, a $F_{30}$ melt strength in the range of 2.5 to 50.0 cN and in the range of 120 to 190 mm/s, like a melt flow rate $MFR_2$ (230° C.) in the range of more 0.8 to 8.0 g/10 min a $F_{30}$ melt strength in the range of 2.5 to 45.0 cN and a $v_{30}$ melt extensibility in the range of 120 to 175 mm/s.

Preferably, the polypropylene (PP), preferably the linear polypropylene (1-PP), has a melting point of at least 140° C., more preferably of at least 150° C. and still more preferably of at least 158° C.

Additionally it is preferred that the polypropylene (PP), preferably the linear polypropylene (1-PP), is used in form of particles of specific size. Accordingly it is preferred that the polypropylene (PP), preferably the linear polypropylene (1-PP), has (a) a particle size distribution $d_{90}$ of below 1,500 μm; more preferably below 1,200 μm, still more preferably in the range of 50 to below 1,200 μm, yet more preferably in the range of 100 to below 1,100 μm, like in the range of 150 to below 1,100 μm;

and/or (b) a particle size distribution $d_{50}$ of below 1,000 μm; more preferably below 800 μm, still more preferably in the range of 30 to below 1,000 μm, yet more preferably in the range of 50 to 850 μm, like in the range of 100 to 750 μm;

and/or (c) a $d_{90}/d_{50}$ ratio of below 1.80, more preferably below 1.75, still more preferably below 1.60, yet more preferably in the range of 1.00 to 1.75, still yet more preferably in the range of 1.10 to 1.60.

The polypropylene (PP), preferably the linear polypropylene (1-PP), can be produced in a known manner for instance by employing a single-site or a Ziegler Natta catalyst. The polypropylene (PP), preferably the linear polypropylene (1-PP), can be a propylene homopolymer (H-PP), preferably a linear propylene homopolymer (1-H-PP), or a propylene copolymer (R-PP), preferably a linear propylene copolymer (1-R-PP). Concerning the comonomer content and type of comonomer it is referred to the information provided above for the branched polypropylene (b-PP), especially it is referred to the high melt strength random propylene copolymer (R-HMS-PP). Preferably the polypropylene (PP) is a linear polypropylene (1-PP). Still more preferably the polypropylene (PP) is a linear propylene homopolymer (1-H-PP). Accordingly all information provided with regard to melt flow rate $MFR_2$ (230° C.), melting point, $F_{30}$ melt strength, $v_{30}$ melt extensibility, and particle size and particle size distribution, respectively, applies especially for the linear propylene homopolymer (1-H-PP).

In a preferred embodiment the polypropylene (PP), preferably the linear polypropylene (1-PP), is free of additives (A). Accordingly in case the instant polypropylene composition comprises additives (A), these additives (A) are not brought in the polypropylene composition during the manufacture of the branched polypropylene (b-PP), i.e. of the high melt strength polypropylene (HMS-PP).

The Polypropylene (PP')

During the preparation of the instant polypropylene composition a further polypropylene (PP') may be added. This polypropylene (PP') is preferably used to bring additives (A) in the instant polypropylene composition. Accordingly in a preferred embodiment the additives (A) are introduced in the instant polypropylene composition in the form of an additive mixture (AM), wherein said additive mixture (AM) comprises, preferably consists of, the polypropylene (PP') and the additives (A).

Preferably the polypropylene (PP') is a linear polypropylene (1-PP').

More preferably the polypropylene (PP'), i.e. the linear polypropylene (PP'), must have a rather low molecular weight and thus a rather high melt flow rate. Accordingly it is preferred that the polypropylene (PP'), preferably the linear polypropylene (1-PP'), has a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min.

Preferably, the polypropylene (PP'), preferably the linear polypropylene (1-PP'), has a melting point of at least 140° C., more preferably of at least 150° C. and still more preferably of at least 158° C.

Further, as mentioned above the polypropylene (PP') is preferably a linear polypropylene (1-PP') and thus shows no or nearby no-branching structure. Due to the absence of branches the linear polypropylene (1-PP') is preferably featured by a low $v_{30}$ melt extensibility and/or a low $F_{30}$ melt strength.

Thus it is preferred that the linear polypropylene (1-PP') has (b) a $F_{30}$ melt strength of more than 1.0 cN, preferably of more than 2.0 cN, more preferably in the range of 1.0 to below 68.0 cN, still more preferably in the range of 1.5 to 65.0 cN, yet more preferably in the range of 2.0 to 60.0 cN, still yet more preferably in the range of 2.5 to 50.0 cN, like in the range of 2.5 to 45.0 cN; and and (b) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

In other words it is preferred that the linear polypropylene (1-PP') has a $F_{30}$ melt strength of more than 1.0 cN and a $v_{30}$ melt extensibility of below 200 mm/s, preferably a $F_{30}$ melt strength of more than 2.0 cN and a $v_{30}$ melt extensibility of below 190 mm/s, more preferably a $F_{30}$ melt strength in the range of 1.0 to below 68.0 cN and a $v_{30}$ melt extensibility in the range of 100 to below 200 mm/s, yet more preferably a $F_{30}$ melt strength in the range of 1.5 to 65.0 cN and in the range of 120 to 190 mm/s, still yet more preferably a $F_{30}$ melt strength in the range of 2.0 to 60.0 cN and in the range of 120 to 190 mm/s, like a $F_{30}$ melt strength in the range of 2.5 to 50.0 cN and a $v_{30}$ melt extensibility in the range of 120 to 175 mm/s.

Accordingly in one specific embodiment the linear polypropylene (1-PP') has (a) a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min;

(b) a $F_{30}$ melt strength of more than 1.0 cN, preferably of more than 2.0 cN, more preferably in the range of 1.0 to below 68.0 cN, still more preferably in the range of 1.5 to 65.0 cN, yet more preferably in the range of 2.0 to 60.0 cN, still yet more preferably in the range of 2.5 to 50.0 cN like in the range of 2.5 to 45.0 cN; and (c) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

Therefore, in one specific embodiment the polypropylene (PP') is a linear polypropylene (1-PP') having a melt flow rate $MFR_2$ (230° C.) of more than 0.5 g/10 min, a $F_{30}$ melt strength of more than 1.0 cN and a $v_{30}$ melt extensibility of below 200 mm/s, preferably a melt flow rate $MFR_2$ (230° C.) in the range of more than 0.5 to 18.0 g/10 min, a $F_{30}$ melt strength of more than 2.0 cN and a $v_{30}$ melt extensibility of below 190 mm/s, more preferably a melt flow rate $MFR_2$ (230° C.) in the range of more 0.6 to 15.0 g/10 min, a $F_{30}$ melt strength in the range of 1.0 to 68.0 cN and a $v_{30}$ melt extensibility in the range of 100 to below 200 mm/s, yet more preferably a melt flow rate $MFR_2$ (230° C.) in the range of more 0.5 to 10.0 g/10 min a $F_{30}$ melt strength in the range of 2.0 to 60.0 cN and in the range of 120 to 190 mm/s, still yet more preferably a melt flow rate $MFR_2$ (230° C.) in the range of more 0.6 to 9.0 g/10 min, a $F_{30}$ melt strength in the range of 2.5 to 50.0 cN and in the range of 120 to 190 mm/s, like a melt flow rate $MFR_2$ (230° C.) in the range of more 0.8 to 8.0 g/10 min a $F_{30}$ melt strength in the range of 2.5 to 45.0 cN and a $v_{30}$ melt extensibility in the range of 120 to 175 mm/s.

Additionally it is preferred that the polypropylene (PP'), preferably the linear polypropylene (1-PP'), is used in form of particles of specific size. Accordingly it is preferred that the polypropylene (PP'), preferably the linear polypropylene (1-PP'), has (a) a particle size distribution $d_{90}$ of below 1,500 µm; more preferably below 1,200 µm, still more preferably in the range of 50 to below 1,200 µm, yet more preferably in the range of 100 to below 1,100 µm, like in the range of 150 to below 1,100 µm;

and/or (b) a particle size distribution $d_{50}$ of below 1,000 µm; more preferably below 800 µm, still more preferably in the range of 30 to below 1,000 µm, yet more preferably in the range of 50 to 850 µm, like in the range of 100 to 750 µm;

and/or (c) a $d_{90}/d_{50}$ ratio of below 1.80, more preferably below 1.75, still more preferably below 1.60, yet more preferably in the range of 1.00 to 1.75, still yet more preferably in the range of 1.10 to 1.60

The polypropylene (PP'), preferably the linear polypropylene (1-PP'), can be produced in a known manner for instance by employing a single-site or a Ziegler Natta catalyst. The polypropylene (PP'), preferably the linear polypropylene (1-PP'), can be a propylene homopolymer (H-PP'), preferably a linear propylene homopolymer (1-H-PP'), or a propylene copolymer (R-PP'), preferably a linear propylene copolymer (1-R-PP'). Concerning the comonomer content and type of comonomer it is referred to the information provided above for the branched polypropylene (b-PP) especially it is referred to the high melt strength random propylene copolymer (R-HMS-PP). Preferably the polypropylene (PP') is a linear polypropylene (1-PP'). Still more preferably the polypropylene (PP') is a linear propylene homopolymer (1-H-PP'). Accordingly all information provided with regard to melt flow rate $MFR_2$ (230° C.), melting point, $F_{30}$ melt strength, $v_{30}$ melt extensibility, and particle size and particle size distribution, respectively, applies especially for the linear propylene homopolymer (1-H-PP').

In a specific embodiment the polypropylene (PP) and the polypropylene (PP') are the same. Accordingly in one preferred embodiment the polypropylene (PP) and the polypropylene (PP') are linear propylene homopolymers, i.e. a linear propylene homopolymer (1-H-PP) and a linear propylene homopolymer (1-H-PP'), with the same properties, in particular in view of melt flow rate $MFR_2$ (230° C.), $F_{30}$ melt strength and $v_{30}$ melt extensibility as discussed above.

As mentioned above the polypropylene (PP') is used as a carrier to introduce the additives (A) in the polypropylene composition. In other words an additive mixture (AM) comprising, preferably consisting of, the polypropylene (PP') and the additives (A) is used in the instant process for the manufacture of the polypropylene composition.

The additives (A) can be any additives useful in the technical area of the high melt strength polypropylene (HMS-PP) and its applications. Accordingly the additives (A) to be used in the polypropylene composition of the invention and thus in form of the additive mixture (AM) include, but are not limited to, stabilizers such as antioxidants (e.g. sterically hindered phenols, phosphites/phosphonites, sulphur containing antioxidants, alkyl radikal scavengers, aromatic amines, hindered amine stabilizers, or blends thereof), metal deactivators (e.g. Irganox MD 1024), or UV stabilizers (e.g. hindered amine light stabilizers). Other typical additives are modifiers such as antistatic or antifogging agents (e.g. ethoxylated amines and amides, or glycerol esters), acid scavengers (e.g. Ca-stearate), blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), nucleating agents (e.g. talc, benzoates, phosphorous-based compounds, sorbitoles, nonitol-based compounds, or amide-based compounds), as well as slip and antiblocking agents (e.g. erucamide, oleamide, talc natural silica and synthetic silica, or zeolites). Preferably the additives (A) are selected from the group consisting of antioxidants (e.g. sterically hindered phenols, phosphites/phosphonites, sulphur containing antioxidants, alkyl radikyl scavengers, aromatic amines, hindered amine stabilizers, or blends thereof), metal deactivators (e.g. Irganox MD 1024), or UV stabilizers (e.g. hindered amine light stabilizers), antistatic or antifogging agents (e.g. ethoxylated amines and amides, or glycerol esters), acid scavengers (e.g. Ca-stearate), blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), nucleating agents (e.g. talc, benzoates, phosphorous-based compounds, sorbitoles, nonitol-based compounds, or amide-based compounds), slip agents, antiblocking agents (e.g. erucamide, oleamide, talc natural silica and synthetic silica, or zeolites) and mixtures thereof.

Typically the total amount of additives (A) in the additive mixture (AM) is not more than 25 wt.-%, more preferably not more than 20 wt.-%, like in the range of 5 to 20 wt.-% based on the total weight of the additive mixture (AM).

The Polypropylene Composition

As mentioned above due to the instant process a polypropylene composition is obtained which comprises a branched polypropylene (b-PP), i.e. a high melt strength polypropylene (HMS-PP). In one embodiment the instant polypropylene composition comprises a branched polypropylene (b-PP), i.e. a high melt strength polypropylene (HMS-PP), a polypropylene (PP'), preferably a linear polypropylene (1-PP'), and optionally at least one additive (A).

The major component in the instant polypropylene composition is the branched polypropylene (b-PP), i.e. the high melt strength polypropylene (HMS-PP). Accordingly the polypropylene composition comprises at least 70 wt.-%, more preferably at least 75 wt.-%, yet more preferably at least 80 wt.-%, still more preferably at least 85 wt.-%, still yet more preferably at least 90 wt.-%, like at least 95 wt.-%, of the branched polypropylene (b-PP), i.e. the high melt strength polypropylene (HMS-PP).

More preferably the instant polypropylene composition comprises
(a) 80 to 99 parts by weight, preferably 90 to 99 parts by weight, more preferably 95 to 99 parts by weight, of the branched polypropylene (b-PP), preferably of the high melt strength polypropylene (HMS-PP); and
(b) optionally 1 to 20 parts by weight, preferably 1 to 10 parts by weight, more preferably 1 to 5 parts by weight, of polypropylene (PP'), preferably of the linear polypropylene (1-PP).

In a preferred embodiment the branched polypropylene (b-PP), i.e. the high melt strength polypropylene (HMS-PP), and the polypropylene (PP'), preferably the linear polypropylene (1-PP'), are the only polymer components in the polypropylene composition. In other words the polypropylene composition may comprise further at least one additive (A) as defined in more detail above but no other polymers in an amount exceeding 5 wt.-%, more preferably exceeding 2 wt.-%, still more preferably exceeding 1 wt.-%, based on the total weight of the polypropylene composition. In a specific embodiment polypropylene composition consists of the branched polypropylene (b-PP), i.e. the high melt strength polypropylene (HMS-PP), the polypropylene (PP'), preferably the linear polypropylene (1-PP'), and at least one additive (A).

Preferably the total amount of additives (A) in the polypropylene composition is not more than 5.0 wt.-%, more preferably not more than 1.0 wt.-%, like in the range of 0.005 to 0.5 wt.-%, based on the total weight of the polypropylene composition.

Therefore the present process is directed to the manufacture of a polypropylene composition comprising
(a) 80 to 99 parts by weight, preferably 90 to 99 parts by weight, more preferably 95 to 99 parts by weight, of the branched polypropylene (b-PP), i.e. of the high melt strength polypropylene (HMS-PP);
(b) optionally 1 to 20 parts by weight, preferably 1 to 10 parts by weight, more preferably 1 to 5 parts by weight, of polypropylene (PP'), preferably of the linear polypropylene (1-PP'), having a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min; and
(c) optionally 0.005 to 5.0, preferably 0.005 to 2.0, more preferably 0.05 to 1.0, like 0.05 to 0.5, parts by weight of additives (A), wherein said additives (A) are preferably selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof.

As mentioned above the branched polypropylene (b-PP), i.e the high melt strength polypropylene (HMS-PP), is the dominant part in the instant polypropylene composition. Accordingly it is preferred that the final polypropylene composition shows a similar rheology behavior as the branched polypropylene (b-PP), i.e. the high melt strength polypropylene (HMS-PP).

Thus the instant polypropylene composition has
(a) a $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN; and
(b) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

In especially preferred embodiment the instant polypropylene composition has a $F_{30}$ melt strength of more than 20.0 cN and a $v_{30}$ melt extensibility of more than 210 to 300 mm/s, like a $F_{30}$ melt strength of more than 20.0 to 50.0 cN and $v_{30}$ melt extensibility of more than 220 to 300 mm/s, more preferably a $F_{30}$ melt strength of more than 21.0 cN and $v_{30}$ melt extensibility of more than 225 mm/s, still more preferably a $F_{30}$ melt strength of 21.0 to 50.0 cN and $v_{30}$ melt extensibility of 225 to 300 mm/s, yet more preferably a $F_{30}$ melt strength of 25.0 to 50.0 cN and $v_{30}$ melt extensibility of 230 to 290 mm/s, still yet more preferably a $F_{30}$ melt strength of 25.0 to 45.0 cN and $v_{30}$ melt extensibility of 230 to 290 mm/s, most preferably a $F_{30}$ melt strength of 30.0 to 45.0 cN and $v_{30}$ melt extensibility of 230 to 290 mm/s, like a $F_{30}$ melt strength of 32.0 to 42.0 cN and $v_{30}$ melt extensibility of 230 to 290 mm/s.

Further it is preferred that the instant polypropylene composition has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min Hence in one specific embodiment, the instant polypropylene composition has
(a) a melt flow rate $MFR_2$ (230° C.) measured according to ISO 1133 of not more than 7.0 g/10 min, preferably in a range of 0.5 to 7.0 g/10 min, more preferably in a range of 0.5 to 7.0 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min;
(b) a $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN; and
(c) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

Accordingly in a more specific embodiment the instant polypropylene composition has a melt flow rate $MFR_2$ (230° C.) has a melt flow rate $MFR_2$ (230° C.) of not more than 7.0 g/10 min, a $F_{30}$ melt strength of more than 20.0 cN and a $v_{30}$ melt extensibility of more than 210 to 300 mm/s, like a melt flow rate $MFR_2$ (230° C.) in a range of 0.5 to 7.0 g/10 min, a $F_{30}$ melt strength of more than 20.0 to 50.0 cN and $v_{30}$ melt extensibility of more than 220 to 300 mm/s, more preferably a melt flow rate $MFR_2$ (230° C.) in a range of 0.5 to 6.0 g/10 min, a $F_{30}$ melt strength of more than 21.0 cN and $v_{30}$ melt extensibility of more than 225 mm/s, still more preferably a melt flow rate $MFR_2$ (230° C.) in a range of 1.0 to 6.0 g/10 min, a $F_{30}$ melt strength of 21.0 to 50.0 cN and $v_{30}$ melt extensibility of 225 to 300 mm/s, yet more preferably a melt flow rate $MFR_2$ (230° C.) in a range of 1.0 to 6.0 g/10 min, a $F_{30}$ melt strength of 25.0 to 50.0 cN and $v_{30}$ melt extensibility of 230 to 290 mm/s, still yet more preferably a melt flow rate $MFR_2$ (230° C.) in a range of 1.0 to 5.0 g/10 min, a $F_{30}$ melt strength of 25.0 to 45.0 cN and $v_{30}$ melt extensibility of 230 to 290 mm/s, most preferably a melt flow rate $MFR_2$ (230° C.) in a range of 1.0 to 5.0 g/10 min, a $F_{30}$ melt strength of 30.0 to 45.0 cN and $v_{30}$ melt extensibility of 230 to 290 mm/s, like a melt flow rate $MFR_2$ (230° C.) in a range of 1.0 to 5.0 g/10 min, a $F_{30}$ melt strength of 32.0 to 42.0 cN and $v_{30}$ melt extensibility of 230 to 290 mm/s.

Essential finding of the present invention is that the branched polypropylene (b-PP), i.e. the high melt strength polypropylene (HMS-PP), and/or the instant polypropylene composition show(s) a reduced gel content. Accordingly it is preferred that the branched polypropylene (b-PP), i.e. the high melt strength polypropylene (HMS-PP), and/or the instant polypropylene composition has/have a gel content of less than 1.00 wt.-%, preferably of less than 0.80 wt.-%, more preferably less than 0.50 wt.-%, still more preferably in the range of 0.01 to less than 1.00 wt.-%, yet more preferably in the range of 0.01 to less than 0.80 wt.-%, still yet more preferably in the range of 0.02 to less than 0.50 wt.-%.

Keeping the information provide above in mind the present invention for instance covers a polypropylene composition comprising
(a) 80 to 99 parts by weight, preferably 90 to 99 parts by weight, more preferably 95 to 99 parts by weight, of the branched polypropylene (b-PP), i.e. of the high melt strength polypropylene (HMS-PP);
(b) optionally 1 to 20 parts by weight, preferably 1 to 10 parts by weight, more preferably 1 to 5 parts by weight, of polypropylene (PP'), preferably of the linear polypropylene (1-PP), having a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min; and
(c) optionally 0.005 to 5.0, preferably 0.005 to 2.0, more preferably 0.05 to 1.0, like 0.05 to 0.5, parts by weight of additives (A), wherein said additives(A) are preferably selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof;
wherein the polypropylene composition has
a melt flow rate $MFR_2$ (230° C.) of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min; and
a gel content of less than 1.00 wt.-%, preferably of less than 0.80 wt.-%, more preferably less than 0.50 wt.-%, still more preferably in the range of 0.01 to less than 1.00 wt.-%, yet more preferably in the range of 0.01 to less than 0.80 wt.-%, still yet more preferably in the range of 0.02 to less than 0.50 wt.-%;

and wherein the polypropylene composition and/or the branched polypropylene (b-PP), i.e. the high melt strength polypropylene (HMS-PP), has/have
a $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN; and
a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

The Foam

As mentioned above, the present invention also features a foam comprising the instant polypropylene composition described herein. Preferably the foam comprises at least 70 wt.-%, more preferably at least 80 wt.-%, more preferably at least 90 wt.-%, yet more preferably at least 95 wt.-%, of the polypropylene composition according to the instant invention. In a preferred embodiment the foam consists of the instant polypropylene composition (apart from the foaming agents if still present in the foam after the foaming process).

The Process

One essential aspect of the present invention is that the manufacture of the polypropylene composition comprising the branched polypropylene (b-PP), i.e. comprising the high melt strength polypropylene (HMS-PP), by using the polypropylene (PP), preferably the linear polypropylene (1-PP). In other words, the present invention relates to a process for providing a polypropylene composition comprising the branched polypropylene (b-PP), wherein the process comprises at least a step (a) in which a polypropylene (PP) is reacted with a thermally decomposing free radical-forming agent and optionally with bifunctionally unsaturated monomer(s) and/or with multifunctionally unsaturated low molecular weight polymer(s) obtaining thereby the branched polypropylene (b-PP). Preferably the instant process comprises subsequent to step (a) a further step (b), in which to the branched polypropylene (b-PP), i.e. to the high melt strength polypropylene (HMS-PP), the polypropylene (PP') is added. Even more preferred the instant process comprises subsequent to step (a) a further step (b), in which to the branched polypropylene (b-PP), i.e. to the high melt strength polypropylene (HMS-PP), the additive mixture (AM) comprising the polypropylene (PP') and the additives (A) is added.

Subsequently the so produced polypropylene composition is subjected to a foaming process obtaining thereby a foam comprising the instant polypropylene composition.

Concerning the definitions and preferred embodiments of the foam, the polypropylene composition, the branched polypropylene (b-PP), the polypropylene (PP), the polypropylene (PP'), the additives (A) and the additive mixture (AM) reference is made to the information provide above.

As mentioned above, in step (a) of the process for the manufacture of polypropylene composition the branched polypropylene (b-PP), i.e. the high melt strength polypropylene (HMS-PP), is obtained by treating the polypropylene (PP), preferably the linear polypropylene (1-PP), with thermally decomposing radical-forming agents. However in such a case a high risk exists that the polypropylene (PP), preferably the linear polypropylene (PP), is degraded, which is detrimental. Thus it is preferred that the chemical modification is accomplished by the additional use of bifunctionally unsaturated monomer(s) and/or multifunctionally unsaturated low molecular weight polymer(s) as chemically bound bridging unit(s). A suitable method to obtain the branched polypropylene (b-PP), i.e. the high melt strength polypropylene (HMS-PP), is for instance disclosed in EP 0 787 750, EP 0 879 830 A1 and EP 0 890 612 A2. All documents are herewith included by reference. Thereby, the amount of thermally decomposing radical-forming agents, preferably of peroxide, is preferably in the range of 0.05 to 3.00 wt.-% based on the amount of the polypropylene (PP). Typically the thermally decomposing radical-forming agents are added together with the bifunctionally unsaturated monomer(s) and/or with multifunctionally unsaturated low molecular weight polymer(s) to the polypropylene (PP), preferably to the linear polypropylene (1-PP). However it is also possible, but less preferred, that first the bifunctionally unsaturated monomer(s) and/or multifunctionally unsaturated low molecular weight polymer(s) is/are added to the polypropylene (PP), preferably to the linear polypropylene (1-PP), and subsequent the thermally decomposing radical-forming agents, or the other way round, first the thermally decomposing radical-forming agents are added to the polypropylene (PP), preferably to the linear polypropylene (1-PP), and subsequent the bifunctionally unsaturated monomer(s) and/or multifunctionally unsaturated low molecular weight polymer(s).

Concerning the bifunctionally unsaturated monomer(s) and/or multifunctionally unsaturated low molecular weight polymer(s) used for the manufacture of the branched polypropylene (b-PP), i.e. the high melt strength polypropylene (HMS-PP), reference is made to the section "the branched polypropylene".

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2, 2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical-forming agents.

Preferably step (b) is initiated when at least 70%, preferably at least 80%, yet more preferably at least 90%, like at least 95 or 99%, of the reaction between the polypropylene (PP) and the thermally decomposing free radical-forming agent and optionally the bifunctionally unsaturated monomer has taken place to obtain the branched polypropylene (b-PP), i.e. the high melt strength polypropylene (HMS-PP).

In a preferred embodiment, an extruder, such as a twin screw extruder, is used for step (a) and for the optional step (b).

The use of an extruder is particularly advantageous in that it can simultaneously be used for the preparation of the branched propylene (b-PP), i.e. the high melt strength polypropylene (HMS-PP), and subsequent for adding the polypropylene (PP') or for adding the additive mixture (AM) to said branched propylene (b-PP). In a preferred embodiment, the polypropylene (PP) is added to an extruder together with—as described in detail above—the thermally decomposing free radical-forming agent, preferably a peroxide, and optionally with the bifunctionally unsaturated monomer(s) and/or with the multifunctionally unsaturated low molecular weight polymer(s), preferably with the bifunctionally unsaturated monomer(s) selected from divinyl compounds, allyl compounds or dienes, to provide the branched polypropylene (b-PP), i.e. the high melt strength polypropylene (HMS-PP), in step (a). It is also possible to use a combination of an extruder downstream a pre-mixing device, wherein the bifunctionally unsaturated monomer(s) and/or the multifunctionally unsaturated low molecular weight polymer(s) and the thermally decomposing free radical-forming agent are add to the polypropylene in the pre-mixing device.

Subsequently, in a step (b) the polypropylene (PP'), preferably the linear polypropylene (1-PP), or the additive mixture (AM) based on said polypropylene (PP'), preferably based on said linear polypropylene (1-PP'), comprising the at least one additive (A) is preferably added at the downstream end of the extruder screw in order not to interfere with the modification reaction for providing branched polypropylene (b-PP), i.e. the high melt strength polypropylene (HMS-PP), as described above. In this respect, the term "downstream end of the extruder screw" is understood as within the last 60% of the length of the extruder screw, preferably within the last 65% of the length of the extruder screw, more preferably at least 70% of the length of the extruder screw, like at least 75% of the extruder screw.

Accordingly, the extruder (E) used for the instant process preferably comprises in operation direction a feed-throat (FT), a first mixing zone (MZ1), a second mixing zone (MZ2) and a die (D), wherein between the first mixing zone (MZ1) and the second mixing zone (MZ2) a side feed-throat (SFT) is located. Preferably the extruder is a screw extruder, like a twin screw extruder. Accordingly the polypropylene (PP), the thermally decomposing free radical-forming agent, preferably a peroxide, and optionally the bifunctionally unsaturated monomer and/or the multifunctionally unsaturated low molecular weight polymer monomer, preferably selected from divinyl compounds, allyl compounds or dienes, but not the polypropylene (PP'), i.e. not the linear polypropylene (1-PP'), and not the additives (A), are fed via the feed-throat (FT), thereby preferably using a feeder, into the extruder and is/are subsequently passed downstream through the first mixing zone (MZ1). Preferably the shear stress in said first mixing zone (MZ1) is of such extent that the polypropylene (PP) is molten and the chemical reaction with the radical-forming agent and with the optional bifunctionally unsaturated monomer and/or multifunctionally unsaturated low molecular weight polymer is initiated. After the first mixing zone (MZ1), i.e. between the first mixing zone (MZ1) and the second mixing zone (MZ2), the polypropylene (PP'), preferably the linear polypropylene (1-PP'), or the additive mixture (AM) is added, i.e. fed into the extruder. Preferably the polypropylene (PP'), preferably the linear polypropylene (1-PP'), or the additive mixture (AM) is added via the side feed-throat (SFT), thereby preferably using a side feeder. Subsequently all components of the polypropylene composition, including the polypropylene (PP'), preferably the linear polypropylene (1-PP'), or the additive mixture (AM) are passed downstream through the second mixing zone (MZ2). Finally the polypropylene composition is discharged via the die (D).

Preferably, the first mixing zone (MZ1) is longer than the second mixing zone (MZ2). Preferably the length ratio between the first mixing zone (MZ1) to the second mixing zone (MZ2) [mm (MZ1)/mm (MZ2)] is at least 2/1, more preferably 3/1, yet more preferably in the range of 2/1 to 15/1, still more preferably 3/1 to 10/1.

The foaming process is in the skilled knowledge. In such a process, a melt of the instant polypropylene composition comprising a gaseous foaming agent such as butane, HFC or $CO_2$ is suddenly expanded through pressure drop. Continuous foaming processes as well as discontinuous process may be applied. In a continuous foaming process, the polypropylene composition is melted and laden with gas in an extruder under pressures typically above 20 bar before extruded through a die where the pressure drop causes the formation of a foam. The mechanism of foaming polypropylene in foam extrusion is explained, for example, in H. E. Naguib, C. B. Park, N. Reichelt, Fundamental foaming mechanisms governing the volume expansion of extruded polypropylene foams, Journal of Applied Polymer Science, 91, 2661-2668 (2004). Processes for foaming are outlined in S. T. Lee, Foam Extrusion, Technomic Publishing (2000). In a discontinuous foaming process, the polypropylene composition (micro-) pellets are laden with foaming agent under pressure and heated below melting temperature before the pressure in the autoclave is suddenly relaxed. The dissolved foaming agent forms bubbles and creates a foam structure. Such preparation of discontinuously foamed beads is described for example in DE 3 539 352.

The Use

Additionally the invention is directed to the use of a polypropylene (PP) having a melt flow rate $MFR_2$ (230° C.) of more than 0.5 g/10 min in the manufacture of a branched polypropylene (b-PP) and thus in the manufacture of a polypropylene composition comprising the branched polypropylene (b-PP) to reduce the gel content of the branched polypropylene (b-PP) and/or of the polypropylene composition comprising the branched polypropylene (b-PP). Preferably the gel content is reduced in case the branched polypropylene (b-PP) and/or the polypropylene composition comprising the branched polypropylene (b-PP) has/have a gel content of less than 1.00 wt.-%, preferably of less than 0.80 wt.-%, more preferably less than 0.50 wt.-%, still more preferably in the range of 0.01 to less than 1.00 wt.-%, yet more preferably in the range of 0.01 to less than 0.80 wt.-%, still yet more preferably in the range of 0.02 to less than 0.50 wt.-%.

Preferred embodiments of polypropylene (PP) are those as defined in the section "the polypropylene (PP)". Concerning the preferred branched polypropylene (b-PP) and the preferred polypropylene composition reference is made to the section the "branched polypropylene (b-PP)" and to the section "the polypropylene composition", respectively. Preferably the polypropylene (PP) is used in a process as described in the section "the process". Accordingly all preferred embodiments discussed above for the branched polypropylene (b-PP), the polypropylene composition, the polypropylene (PP), the polypropylene (PP'), the additives (A) and the additive mixture (AM) are also preferred for the instant use. Thus for instance the present invention is directed to the use of a polypropylene (PP) in the process for the manufacture of a branched polypropylene (b-PP) and thus for the manufacture of a polypropylene composition comprising the branched polypropylene (b-PP) to reduce the gel content of the branched polypropylene (b-PP) and/or of the polypropylene composition comprising the branched polypropylene (b-PP), wherein the process comprises at least a step (a) in which the polypropylene (PP) is reacted with a thermally decomposing free radical-forming agent and optionally with bifunctionally unsaturated monomer(s) and/or with multifunctionally unsaturated low molecular weight polymer(s) obtaining thereby the branched polypropylene (b-PP), wherein (a) the polypropylene (PP) has
  (a1) a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min;
  (a2) preferably a $F_{30}$ melt strength of more than 1.0 cN, more preferably of more than 2.0 cN, still more preferably in the range of 1.0 to below 68.0 cN, yet more preferably in the range of 1.5 to 65.0 cN, still yet more preferably in the range of 2.0 to 60.0 cN, like preferably in the range of 2.5 to 50.0 cN, most in the range of 2.5 to 45.0 cN; and
  (a3) preferably a $v_{30}$ melt extensibility of below 200 mm/s, more preferably of below 190 mm/s, still more preferably in the range of 100 to below 200 mm/s, yet more preferably in the range of 120 to 190 mm/s, still yet more preferably in the range of 120 to 175 mm/s, like in the range of 125 to 170 mm/s;

and (b) the polypropylene composition and/or the branched polypropylene (b-PP) has/have
  (b1) a melt flow rate $MFR_2$ (230° C.) not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min;
  (b2) a $F_{30}$ melt strength of more than 20.0 cN, like of more than 20.0 to 50.0 cN, more preferably of more than 21.0 cN, still more preferably of 21.0 to 50.0 cN, yet more preferably of 25.0 to 50.0 cN, still yet more preferably of 25.0 to 45.0 cN, most preferably of 30.0 to 45.0 cN, like of 32.0 to 42.0 cN; and
  (b3) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s;

wherein further the gel content is reduced in case the branched polypropylene (b-PP) and/or the polypropylene composition comprising the branched polypropylene (b-PP) has/have a gel content of less than 1.00 wt.-%, preferably of less than 0.80 wt.-%, more preferably less than 0.50 wt.-%, still more preferably in the range of 0.01 to less than 1.00 wt.-%, yet more preferably in the range of 0.01 to less than 0.80 wt.-%, still yet more preferably in the range of 0.02 to less than 0.50 wt.-%.

In one embodiment the branched polypropylene (b-PP), i.e. the high melt strength polypropylene (HMS-PP), has been mixed with a polypropylene (PP') or with an additive mixture (AM) after step (A). Accordingly the polypropylene composition preferably comprises (a) 80 to 99 parts by weight, preferably 90 to 99 parts by weight, more preferably 95 to 99 parts by weight, of the branched polypropylene (b-PP), i.e. of the high melt strength polypropylene (HMS-PP);

(b) optionally 1 to 20 parts by weight, preferably 1 to 10 parts by weight, more preferably 1 to 5 parts by weight, of polypropylene (PP'), preferably of the linear polypropylene (1-PP), having a melt flow rate $MFR_2$ (230° C.) measured according to ISO 1133 of more than 0.5 g/10 min, preferably in the range of more than 0.5 to 18.0 g/10 min, like of more than 0.5 to 15.0 g/10 min or of more than 0.6 to 15.0 g/10 min, more preferably of more than 0.5 to below 10.0 g/10 min, still more preferably of more than 0.6 to 9.0 g/10 min, yet more preferably of 0.8 to 8.0 g/10 min; and (c) optionally 0.005 to 5.0, preferably 0.005 to 2.0, more preferably 0.05 to 1.0, like 0.05 to 0.5, parts by weight of additives (A), wherein said additives(A) are preferably selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof.

In the following, the present invention is described in more detail by way of examples.

EXAMPLES

A. Measuring Methods

The following definitions of terms and determination methods apply for the above general description of the invention as well as to the below examples unless otherwise defined.

Comonomer Content in Polypropylene

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Propylene-1-butene-copolymers were evaluated at 767 $cm^{-1}$. Quantitative results are obtained based upon reference to the film thickness.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step $MFR_2$ (230° C.) is measured according to ISO 1133 (230° C., 2.16 kg load).

$F_{30}$ melt strength and $v_{30}$ melt extensibility

The test described herein follows ISO 16790:2005.

The strain hardening behaviour is determined by the method as described in the article "Rheotens-Mastercurves and Drawability of Polymer Melts", M. H. Wagner, Polymer Engineering and Sience, Vol. 36, pages 925 to 935. The content of the document is included by reference. The strain hardening behaviour of polymers is analysed by Rheotens apparatus (product of Gottfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm).

The gear pump was pre-adjusted to a strand extrusion rate of 5 mm/s, and the melt temperature was set to 200° C. The spinline length between die and Rheotens wheels was 80 mm At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 $mm/sec^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

Gel Content

About 2 g of the polymer ($m_p$) are weighted and put in a mesh of metal which is weighted ($m_{p+m}$). The polymer in the mesh is extracted in a soxhlet apparatus with boiling xylene for 5 hours. The eluent is then replaced by fresh xylene and the boiling is continued for another hour. Subsequently, the mesh is dried and weighted again ($m_{XHU+m}$). The mass of the xylene hot unsolubles ($m_{XHU}$) obtained by the formula $m_{XHU+m} - m_m = m_{XHU}$ is put in relation to the weight of the polymer ($m_p$) to obtain the fraction of xylene insolubles $m_{XHU}/m_p$.

Particle Size/Particle Size Distribution

A gradation test was performed on the polymer samples. The sieve analysis involved a nested column of sieves with wire mesh screen with the following sizes: >20 μm, >32 μm, >63 μm, >100 μm, >125 μm, >160 μm, >200 μm, >250 μm, >315 μm, >400 μm, >500 μm, >710 μm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve.

B. Examples

Linear Polypropylene (l-PP)

1-PP1 is a linear propylene homopolymer having a $MFR_2$ (230° C.) of 0.37 g/10 min, a $d_{50}$ of 1,100 μm, a $d_{90}$ of 1,650 μm, a melting temperature Tm of 164° C., a $F_{30}$ melt strength of 68 cN and $v_{30}$ melt extensibility 146 mm/s.

1-PP2 is a linear propylene homopolymer having a $MFR_2$ (230° C.) of 0.90 g/10 min, a $d_{50}$ of 625 μm, a $d_{90}$ of 970 μm, a melting temperature Tm of 162° C., a $F_{30}$ melt strength of 39 cN and $v_{30}$ melt extensibility 155 mm/s.

Additive Mixture

The linear polypropylenes 1-PP2 was used to provide additive mixture (AM) containing further additives as a masterbatch for incorporating into a base polymer of branched polypropylene. The additive mixture contains 85 wt.-% of the linear polypropylenes 1-PP1, 10.00 wt.-% Irganox B 225 FF (antioxidant), and 2.50 wt.-% Hydrotalcit and 2.50 wt % of Ca Stearate.

Inventive Examples IE1 and IE2 and Comparative Examples CE1 to CE3

1-PP1 for the comparative examples CE1 to CE3 and 1-PP2 for the inventive examples IE1 and IE2 were subjected to a reactive extrusion in the presence of butadiene and peroxide as described in the following. Both the butadiene and the peroxide (75% solution of tertbutylperoxy isopropyl carbonate "Trigonox BPIC-C75" of Akzo Nobel) (amounts are indicated in table 3) were pre-mixed with the 1-PP1 powder prior or 1-PP2 powder to the melt-mixing step in a horizontal mixer with paddle stirrer at a temperature of 65° C., maintaining an average residence time of 15 to 20 minutes. The pre-mixture was transferred under inert atmosphere to a co-rotating twin screw extruder of the type Theyson TSK60 having a barrel diameter of 60 mm and an L/D-ratio of 48 equipped with a high intensity mixing screw having 3 kneading zones and a two-step degassing setup. The melt temperature profile is given in table 1. The screw speed and throughput is indicated in table 2. In the first ¾ of the extruder length the branched polypropylene is produced (b-PP). Subsequently, via a side feeder, i.e. at the last ¼ of the extruder length, the additive mixture is fed into the extruder to the produced branched polypropylene (b-PP) The extruded polypropylene composition was discharged and pelletized. From the pellets the gel content has been measured. The final properties are indicated in table 3.

TABLE 1

Set temperature profile in the extruder

| Zone | 1 to 6 | 7 | 8 | 9 | 10 | 11 | 12 | 13 | 14 |
|---|---|---|---|---|---|---|---|---|---|
| Temperature [° C.] | 280 | 270 | 260 | 220 | 250 | 270 | 240 | 240 | 230 |

TABLE 2

Process conditions

|  |  | IE 1 | IE 2 | CE 1 | CE 2 | CE 3 |
|---|---|---|---|---|---|---|
| Peroxide* | [wt.-%] | 0.675 | 0.750 | 0.675 | 0.825 | 0.860 |
| butadiene* | [wt.-%] | 1.6 | 1.8 | 1.6 | 1.5 | 1.9 |
| screw speed | [rpm] | 400 | 400 | 400 | 400 | 400 |
| throughput | [kg/h] | 225 | 225 | 225 | 225 | 225 |
| additive mixture* | [wt.-%] | 2 | 2 | 2 | 2 | 2 |

*based on the total amount of the polypropylene composition

TABLE 3

Properties of polypropylene composition

|  | $MFR_2$ [g/10 min] | $F_{30}$ [cN] | $v_{30}$ [mm/s] | Gel content [wt.-%] |
|---|---|---|---|---|
| IE1 | 2.3 | 35.6 | 249 | 0.04 |
| IE2 | 2.6 | 36.9 | 249 | 0.10 |
| CE1 | 2.2 | 31.0 | 253 | 0.76 |
| CE2 | 1.9 | 32.3 | 249 | 1.31 |
| CE3 | 1.5 | 36.6 | 241 | 2.03 |

The invention claimed is:

1. Process for providing a polypropylene composition that includes:
   a branched polypropylene (b-PP), the process comprising:
   (A) reacting polypropylene (PP) with a thermally decomposing free radical-forming agent and optionally with bifunctionally unsaturated monomer(s) and/or with multifunctionally unsaturated low molecular weight polymer(s) to obtain the branched polypropylene (b-PP), wherein;
   the polypropylene (PP) has a melt flow rate $MFR_2$ (230° C.) of more than 0.5 g/10 min;
   the polypropylene composition and/or the branched polypropylene (b-PP) has/have a $F_{30}$ melt strength of more than 20.0 cN and a $v_{30}$ melt extensibility of more than 200 mm/s, wherein the $F_{30}$ melt strength and the $v_{30}$ melt extensibility are measured according to ISO 16790: 2005, and
   the polypropylene (PP) is used in the form of particles having a particle size distribution $d_{90}$ of below 1.500 μm, $d_{50}$ of below 1.000 μm, and a $d_{90}/d_{50}$ ratio of below 1.80.

2. Process according to claim 1, wherein the polypropylene (PP):
   is a propylene homopolymer; and/or
   is a linear polypropylene (l-PP) having a $F_{30}$ melt strength of more than 1.0 cN and a $v_{30}$ melt extensibility of below 200 mm/s, wherein the $F_{30}$ melt strength and the $v_{30}$ melt extensibility are measured according to ISO 16790:2005.

3. Process according to claim 1, wherein:
   the thermally decomposing free radical-forming agent is a peroxide; and/or
   the bifunctionally unsaturated monomer is selected from the group consisting of divinyl compounds, allyl compounds, and dienes.

4. Process according to claim 1, further comprising subsequent to step (A):
   (B) adding to the branched polypropylene (b-PP) a polypropylene (PP') having a melt flow rate $MFR_2$ (230° C.) of 0.5 to 18.0 g/10 min.

5. Process according to claim 4, wherein:
   step (b) is initiated when at least 80% of the reaction between the polypropylene (PP) and the thermally decomposing free radical-forming agent and optionally the bifunctionally unsaturated monomer has taken place; and/or
   the polypropylene (PP') is a linear polypropylene (l-PP'), said linear polypropylene (l-PP') has a $F_{30}$ melt strength of more than 1.0 cN and a $v_{30}$ melt extensibility of below 200 mm/s, wherein the $F_{30}$ melt strength and the $v_{30}$ melt extensibility are measured according to ISO 16790:2005.

6. The process according to claim 4, wherein step (A) and optionally step (B) are accomplished in an extruder, said extruder comprises in operation direction a first mixing zone (MZ1) and a second mixing zone (MZ2), wherein further the step (a) takes place in the first mixing zone (MZ1) whereas optionally step (b) takes place in the second mixing zone (MZ2), the extruder comprises in operation direction a feed-throat (FT), the first mixing zone (MZ1), the second mixing zone (MZ2) and a die (D), wherein between the first mixing zone (MZ1) and the second mixing zone (MZ2) a side feed-throat (SFT) is located, wherein further the polypropylene (PP), the thermally decomposing free radical-forming agent, and optionally the bifunctionally unsaturated monomer are fed via the feed-throat (FT) and optionally the polypropylene (PP') is fed via the side feed-throat (SFT).

7. The process according to claim 6, wherein:
the reaction between the polypropylene (PP) and the thermally decomposing free radical-forming agent and optionally the bifunctionally unsaturated monomer takes place in the first mixing zone (MZ1); and/or
not more than 10 wt.-% of the total amount of the branched polypropylene (b-PP) of the polypropylene composition is produced in the second mixing zone (MZ2).

8. The process according to claim 4, wherein 1 to 6 parts by weight of the polypropylene (PP') are added to 95 to 99 parts by weight of branched polypropylene (b-PP).

9. The process according to claim 1, wherein:
the polypropylene (PP') comprises at least one additive (A) selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof; and/or
the branched polypropylene (b-PP) is free of additives (A).

10. The process according to claim 1, wherein the resulting polypropylene composition has:
a $F_{30}$ melt strength of 25.0 cN to 50.0 cN and a $v_{30}$ melt extensibility of 210 to 300 mm/s; and/or
a gel content of less than 1.00 wt.-%, -of less than 0.80 wt.-%.

11. Polypropylene composition obtained by the process according to claim 1, comprising:
95 to 99 parts by weight of a branched polypropylene (b-PP);
optionally 1 to 5 parts by weight of a polypropylene (PP') having a melt flow rate $MFR_2$ (230 ° C.) measured according to ISO 1133 of more than 0.5 to 18.0 g/10 min; and
optionally 0.005 to 5.0 parts by weight of additives (A), wherein said additives(A) are selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof;
wherein the polypropylene composition has;
a melt flow rate $MFR_2$ (230° C.) measured according to ISO 1133 of 1.0 to below 7.0 g/10 min, and
a gel content of less than 1.00 wt. %, and wherein the polypropylene composition and/or the branched polypropylene (b-PP) has/have a $F_{30}$ melt strength of 25.0 cN to 50.0 cN and a $v_{30}$ melt extensibility of 210 to 300 mm/s, wherein the $F_{30}$ melt strength and the $v_{30}$ melt extensibility are measured according to ISO 16790:2005.

12. Process for the manufacture of a foam comprising:
(A) reacting a polypropylene (PP) with a thermally decomposing free radical-forming agent and optionally with bifunctionally unsaturated monomer(s) and/or with multifunctionally unsaturated low molecular weight polymer(s) to obtain a polypropylene composition comprising a branched polypropylene (b-PP), wherein
(i) the polypropylene (PP) has a melt flow rate $MFR_2$ (230° C.) of more than 0.5 g/10 min;
(ii) the polypropylene composition and/or the branched polypropylene (b-PP) has/have a $F_{30}$ melt strength of more than 20.0 cN and a $v_{30}$ melt extensibility of more than 200 mm/s, wherein the $F_{30}$ melt strength and the $v_{30}$ melt extensibility are measured according to ISO 16790: 2005, and
(iii) the polypropylene (PP) is used in the form of particles having a particle size distribution $d_{90}$ of below 1.500 µm, $d_{50}$ of below 1.000 µm, and a $d_{90}/d_{50}$ ratio of below 1.80;
(B) subjecting the polypropylene composition of step (A) to a foaming process to obtain a foam.

13. Process according to claim 12, wherein the polypropylene composition comprises:
95 to 99 parts by weight of a branched polypropylene (b-PP); and
optionally 1 to 5 parts by weight of a polypropylene (PP') having a melt flow rate $MFR_2$ (230° C.) measured according to ISO 1133 of more than 0.5 to 18.0 g/10 min,
optionally 0.005 to 5.0 parts by weight of additives (A), wherein said additives(A) are selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof;
wherein the polypropylene composition has;
a melt flow rate $MFR_2$ (230 ° C.) measured according to ISO 1133 of 1.0 to below 7.0 g/10 min, and
a gel content of less than 1.00 wt. %, less than 0.80 wt. %;
and wherein the polypropylene composition and/or the branched polypropylene (b-PP) has/have a $F_{30}$ melt strength of 25.0 cN to 50.0 cN and a $v_{30}$ melt extensibility of 210 to 300 mm/s, wherein the $F_{30}$ melt strength and the $v_{30}$ melt extensibility are measured according to ISO 16790:2005.

14. Foam comprising a polypropylene composition according to claim 11.

* * * * *